United States Patent
Hofhaus et al.

(10) Patent No.: US 8,375,732 B2
(45) Date of Patent: Feb. 19, 2013

(54) METHOD FOR CONTROLLING AN AIR CONDITIONING SYSTEM IN A VEHICLE

(75) Inventors: Joern Hofhaus, Freising (DE); Christian Schmidt, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 468 days.

(21) Appl. No.: 12/776,017

(22) Filed: May 7, 2010

(65) Prior Publication Data
US 2010/0212332 A1 Aug. 26, 2010

Related U.S. Application Data

(63) Continuation of application No. PCT/EP2008/008467, filed on Oct. 8, 2008.

(30) Foreign Application Priority Data

Nov. 16, 2007 (DE) .......................... 10 2007 056 356

(51) Int. Cl.
*F25D 21/00* (2006.01)
*F25D 17/00* (2006.01)
(52) U.S. Cl. ........................... 62/150; 62/176.1; 62/186
(58) Field of Classification Search ................. 62/150, 62/176.1, 180, 186; 236/44 A
See application file for complete search history.

(56) References Cited

U.S. PATENT DOCUMENTS

| | | | |
|---|---|---|---|
| 5,139,458 A * | 8/1992 | Koukal et al. | 454/147 |
| 2006/0236662 A1* | 10/2006 | Currle et al. | 55/315 |
| 2011/0048040 A1* | 3/2011 | Hofhaus | 62/93 |

FOREIGN PATENT DOCUMENTS

| | | |
|---|---|---|
| DE | 36 24 171 A1 | 1/1988 |
| DE | 39 42 290 C1 | 6/1991 |
| DE | 197 28 579 C1 | 6/1998 |
| DE | 197 56 983 C1 | 11/1998 |
| DE | 10 2004 008 970 A1 | 9/2005 |
| DE | 10 2004 055 259 | 3/2006 |
| DE | 10 2004 045 886 A1 | 4/2006 |
| DE | 10 2006 018 905 A1 | 10/2006 |
| DE | 10 2006 034 231 A1 | 1/2008 |
| EP | 0 780 253 | 6/1997 |
| WO | WO88/00536 | 1/1988 |

OTHER PUBLICATIONS

German Search Report dated Nov. 16, 2007 with English translation (Nine (9).
PCT Intl. Search Report dated Feb. 4, 2009 (Two (2) pages)).
Kaefer O: "PKW-Klimatisierung—Umluftautomatik Mit Feuchteregelung Im Fahrzeuginnenraum", ATZ Automobiltechnische Zeitschrift, Vieweg Publishing, Wiesbaden, DE, vol. 100, No. 6, Jun. 1, 1998, pp. 436-438, 440, 4, XP000765349 ISSN: 0001-2785 (cited in B2).

* cited by examiner

*Primary Examiner* — Marc Norman
(74) *Attorney, Agent, or Firm* — Crowell & Moring LLP

(57) ABSTRACT

A method for controlling an air conditioning system in a vehicle to reduce the humidity entering into the interior of the vehicle is disclosed. One aspect of the disclosure is that a measure for the amount of water collected at the fresh air intake port is determined as a function of a sensor signal. Thereafter, the determined measure for the amount of water collected at the fresh air intake port may be used to control the air conditioning system in such a manner that the amount of air that is drawn in through the fresh air intake port is reduced.

16 Claims, 1 Drawing Sheet

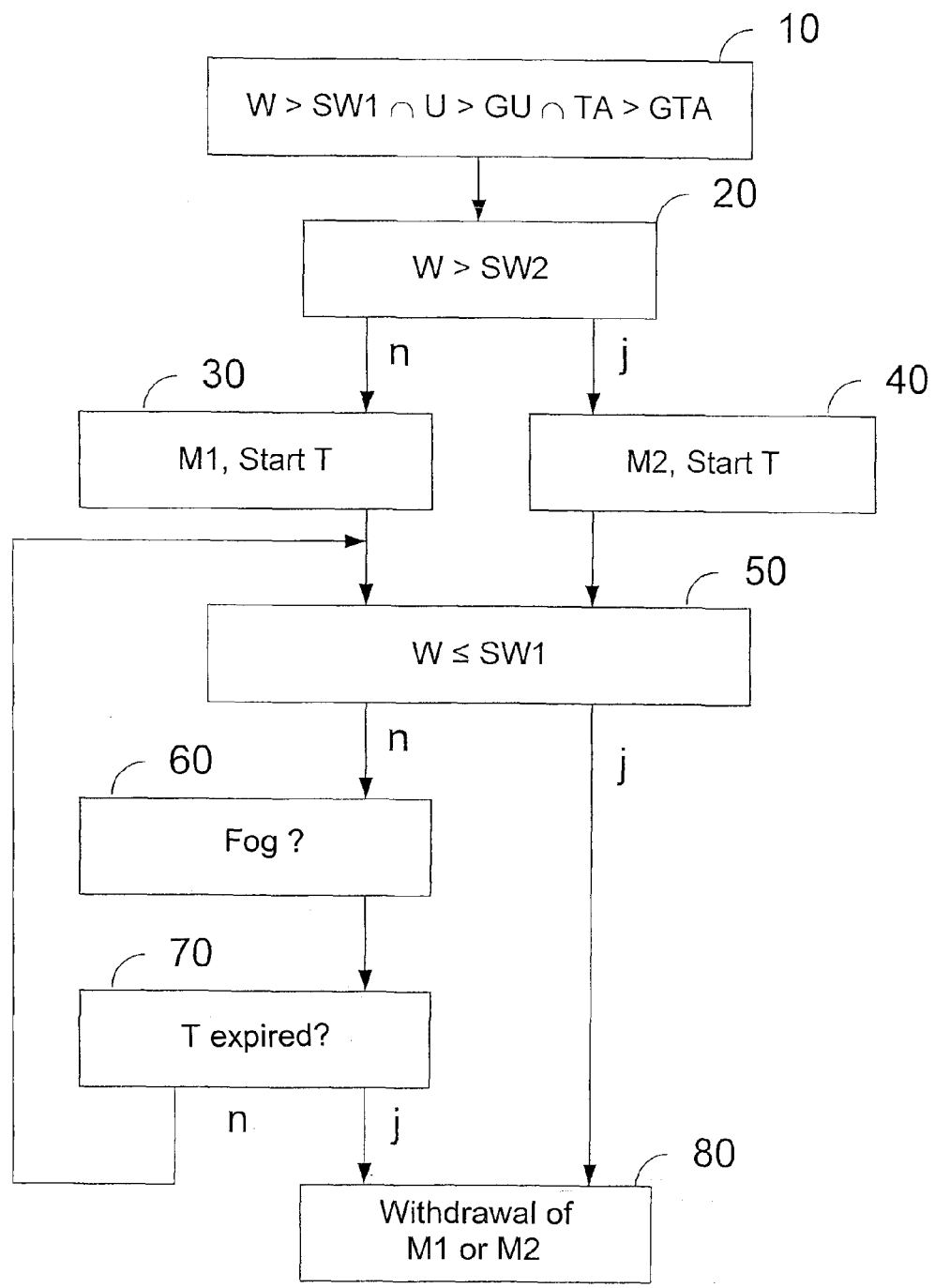

METHOD FOR CONTROLLING AN AIR CONDITIONING SYSTEM IN A VEHICLE

CROSS REFERENCE TO RELATED APPLICATIONS

This application is a continuation of PCT International Application No. PCT/EP2008/008467, filed Oct. 8, 2008, which claims priority under 35 U.S.C. §119 from German Patent Application No. 10 2007 056 356.8, filed Nov. 16, 2007, the entire disclosures of which are herein expressly incorporated by reference.

BACKGROUND AND SUMMARY OF THE INVENTION

The invention relates to a method for controlling an air conditioning system in a vehicle to reduce the humidity entering into the interior of the vehicle.

In most motor vehicles the fresh air intake of the heating and air conditioning system occurs almost exclusively through a gap that is produced between the engine hood and the windshield. In the event of heavy rain or driving through a carwash, considerable amounts of water may penetrate into the areas that house the equipment units that are located below the engine hood. In order to enable relatively dry fresh air to flow through the fresh air intake port into the interior of the vehicle, or rather into the heating and air conditioning system, the equipment area exhibits design features for separating air and water, that is, for the removal of water.

The configuration of such design features is typically based on the maximum amount of water that can be expected to occur, as for example in the case of tropical rain downpours or even in the case of U.S. carwashes that clean the vehicles with an enormous amount of water. In such cases, it has to be guaranteed that even under these extreme conditions there will be no intake of water, even when the air conditioning system is running at a high air flow rate. The result of these design features is often that the fresh air intake exhibits a higher flow resistance, a state that is disadvantageous to the targeted air volume and the acoustic properties of the blower.

In order to draw in as much dry air as possible, DE 10 2004 055 259 B3 discloses an air supply device that is intended for the passenger compartment of a vehicle and that has a rotating element that is connected upstream of an air conditioner blower and is located in the axial intake region of the air conditioner blower. The rotating element covers the air entry region in such a manner that all of the droplets that are drawn in impinge on this element. The rotational motion of the element causes the intake droplets to be thrown outwards, where they are caught by droplet catching elements and then conveyed away. Such an air supply device is extremely expensive and has a high space requirement.

As an alternative, DE 10 2006 018 905 A1 discloses an air duct system for conveying the intake air in a vehicle. In this case the air duct system is provided with water removing means for separating the water from the intake air. The drawback with this system is that the water removing means has just a limited holding capacity and is thus inadequate for use with extremely large quantities amounts of water. All of the design features have in common that they incur additional costs.

The object of the invention is to provide a method that makes it possible to reduce the humidity entering into the passenger compartment in a simple and cost effective way. The invention achieves this object with the subject matter of the independent patent claim. Advantageous further developments are the subject matter of the dependent patent claims.

The invention is based on the recognition that it is possible to reduce the entry of humidity by suitably controlling the air conditioning system. The inventive method for controlling the air conditioning system is characterized in that a measure for the amount of water collected at the fresh air intake port is determined as a function of a sensor signal, and that as a function of the determined measure for the amount of water collected at the fresh air intake port, the air conditioning system is controlled in such a manner that the amount of air that is drawn in through the fresh air intake port is reduced. Therefore, the fundamental idea is that a sensor signal is evaluated in a first step and that this sensor signal allows conclusions to be drawn about the amount of water that has collected in the hood gap. If a corresponding amount of water is detected, then in the next step the system can respond to the risk of drawing in water with suitable measures that reduce the amount of fresh intake air.

It is advantageous to reduce the amount of air drawn in through the fresh air intake port at the point when the determined measure for the amount of water that has collected at the fresh air intake port exceeds a pre-set limit value. In this way the control of the air conditioning system is changed only when extremely large masses of water are on hand. A negative impact on the vehicle passengers is suppressed because the change in the control of the air conditioning system is generally implemented for only a short period of time (during a sudden downpour or while driving through a carwash).

In certain embodiments, the aforementioned method of reducing the amount of air drawn in through the fresh air intake port may be applied when the vehicle is driven through a carwash where a high quantity of water can be expected. The drive-through of a carwash can be detected by the evaluation of additional signals. Hence, in one advantageous embodiment of the invention the amount of air that is drawn in through the fresh air intake port can be reduced when, for example, the speed of the vehicle is also less than a pre-set speed limit value.

Another aspect of the invention is to reduce the amount of air drawn in through the fresh air intake port only when one or more additional criteria are met, such as when the blower output of the air conditioning system is greater than a pre-set blower limit value and/or if additionally the outside temperature is higher than a pre-set outside temperature limit value (e.g., higher than the freezing point). An evaluation of the outside temperature is practical, especially if there is the risk that the detecting sensor will ice up and thus would deliver, despite the dryness, a signal that would indicate a very high quantity of water in front of the fresh air intake port.

In order to reduce the amount of air that is drawn in through the fresh air intake port, various measures for controlling the air conditioning system can be implemented in an advantageous way. For example, the amount of air that is drawn in through the fresh air intake port can be reduced by enlarging the opening angle of the air recirculation flap and/or by reducing the blower voltage. In extreme cases, it is possible to even throttle or totally close the fresh air flap so that no water can be entrained in the intake air.

In principle the amount of air that is drawn in through the fresh air intake port is reduced only until at least one of the conditions for initiating the reduction of the amount of intake air is no longer fulfilled. If additional signals, such as speed and outside temperature are evaluated, then the change in the control of the air conditioning system may be cancelled even if a higher speed is determined or the outside temperature falls below the freezing point.

In order to ensure that the vehicle passengers will not be negatively affected by the change in the control of the air conditioning system, one aspect of the invention is to ensure that the aforementioned modified air intake control is not implemented too long. Ideally the amount of air that is drawn in through the fresh air intake port can be reduced only until a targeted time interval has expired. In order to prevent fogging of the windows, the humidity in the interior or rather a signal that correlates with the humidity in the interior of the vehicle and/or the signal of a fogging sensor can be evaluated. If the interior humidity exceeds a pre-set limit value, then the air conditioning system can be operated again in the original control mode or switched into a de-humidifying mode.

In order to determine the amount of water that has collected at the fresh air intake port or rather a variable that correlates with the same, a variety of sensors can be used. It can be a sensor that has been installed exclusively for this purpose or an expanded sensor. It is advantageous if the measure for the amount of water that has collected at the fresh air intake port can be determined in the equipment area as a function of the signal of a fluid level indicating sensor that indicates the current accumulation level at a specific spot. Alternatively, or in addition, the amount of water that has collected at the fresh air intake port can be determined as a function of the signal of an optical sensor unit for determining the droplet flight in front of the fresh air intake port.

As an alternative or in addition, any existing sensor can also be used if capable of delivering information about the amount of water that has accumulated in the equipment area (e.g., at the fresh air intake port). Especially appropriate for this purpose is a rain sensor that is typically installed in the base of the internal mirror in vehicles with automatic wipers.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 depicts one embodiment of the invention. In this embodiment, the FIG. 1 shows one advantageous embodiment of the inventive method that can be implemented in a control unit of an air conditioning system.

DETAILED DESCRIPTION OF THE DRAWINGS

With reference to the process depicted in FIG. 1, at block 10 a determined measure for the amount of water ("W") that has collected at the fresh air intake port is compared with a pre-set first limit value ("SW1"). In this case, the limit value can be pre-set so as to be fixed or variable as a function of various parameters. At the same time, the blower voltage ("U") is compared with a pre-set blower limit value ("GU"), and the outside temperature ("TA") is compared with a pre-set outside temperature limit value ("GTA") that corresponds to the freezing point in this example. If the determined measure for the amount of collected water W exceeds the first limit value SW1 and if the blower voltage U exceeds the pre-set blower limit value GU and if the determined outside temperature TA exceeds the pre-set outside temperature value GTA, then the process proceeds to block 20 where a determination is made as to whether the determined measure for the amount of collected water W also exceeds a pre-set second limit value ("SW2"), where SW2 is greater than the pre-set first limit value SW1. In this respect, the second limit value SW2 can be established in such a way that it is exceeded only in the event of very large amounts of water W, as for example, when driving through a carwash. Not shown here, but just as possible, is an evaluation of the speed of the vehicle with respect to undershooting a pre-set limit value. A variety of measures ("M1" or "M2") for reducing the water entering into the air conditioning system, or rather into the interior of the vehicle, are implemented as a function of whether the determined measure W exceeds SW1 only or also the second limit value SW2.

In order to reduce the amount of air (and thus the amount of intake water) that is drawn in through the fresh air intake port, the process of FIG. 1 proceeds to block 30 and initiates the predefined first measures M1 for reducing the intake air, in the event that the first limit value SW1 is exceeded, but the second limit value SW2 is not. These predefined first measures M1 may involve a reduction in the blower voltage and an increase in the opening angle of the air recirculation flap. At the same time a timer ("T") is started. If the measure for the amount of collected water W is greater than the pre-set second limit value SW2, then the process of FIG. 1 may continue to block 40 where the predefined second measures M2 for reducing the intake air may be initiated. In this case, the fresh air flap may be totally closed to minimize the amount of water entering. At the same time, the timer T may be started.

After initiating the measures M1 or M2 and after starting the timer T, the process may proceed to block 50, where a determination may be made as to whether the determined measure for the amount of collected water W no longer exceeds the pre-set first limit value SW1. If this is the case, then the process may continue to block 80 where the implemented measures M1 or M2 for reducing the fresh intake air again may be applied. If the amount of collected water W continues to exceed the limit value SW1, at block 60 a check may be performed to determine whether the conditions for fogging of the windows are met. If this is the case, then the process may proceed to block 80 where again the implemented measures M1 or M2 for reducing the fresh intake air may be applied. If the air conditioning system comprises a de-humidifying mode, then this may be activated as well.

If there is no mist on the windows, a check at block 70 may be performed to determine whether the timer has expired. As long as the timer has not expired, the process may continue back to block 50, and the various criteria may be checked according to blocks 50, 60, and 70 until one criterion is fulfilled. Thereafter, the process may continue to block 80 where the measures M1 or M2 for reducing the fresh intake air are applied again.

Thus, at least one advantage of the invention lies in the fact that the air intake, or rather water removal feature, can be configured in such a manner that the flow losses can be reduced compared to the current state of the art. According to one or more embodiments of the invention, such flow losses may occur only in the case of high quantities of water in conjunction with a large amount of fresh air. In addition, the system is able to compare design weaknesses in the water separation that are caused, for example, by the pedestrian safety requirements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an air conditioning system in a vehicle to reduce the humidity entering into the interior of the vehicle comprises the acts of:

determining a measure for an amount of water collected at a fresh air intake port of the vehicle; and reducing, in response to the determined measure of the amount of water collected at the fresh air intake port, an amount of air that is drawn in by the air conditioning system through the fresh air intake port.

2. The method of claim 1, wherein reducing the amount of the air that is drawn in by the air conditioning system comprises reducing the amount of the air that is drawn in by the air conditioning system when the measure for the amount of water collected at the fresh air intake port exceeds a pre-set limit value.

3. The method of claim 2, wherein reducing the amount of the air that is drawn in by the air conditioning system comprises reducing the amount of the air that is drawn in by the air conditioning system if at least one additional condition is met, wherein the at least one additional condition includes the speed of the vehicle being less than a pre-set speed limit value, the blower output of the air conditioning system is greater than a pre-set blower limit value, and the outside temperature being higher than a pre-set outside temperature limit value.

4. The method of claim 1, wherein reducing the amount of air that is drawn in by the air conditioning system through the fresh air intake port further comprises at least one of enlarging an opening angle of the air recirculation flap, reducing a blower voltage, and throttling or closing a fresh air flap.

5. The method of claim 1, wherein reducing the amount of the air that is drawn in by the air conditioning system comprises reducing the amount of the air that is drawn in by the air conditioning system until at least one of a targeted time interval has expired, at least one condition for reducing the amount of air drawn in through the fresh air intake port is no longer fulfilled, or until a humidity in the interior of the vehicle exceeds a pre-set limit value.

6. The method of claim 1, wherein determining the measure for the amount of water collected at the fresh air intake port comprises determining the measure for the amount of water as a function of the signal of a fluid level indicating sensor in the area that houses the equipment units, or as a function of a signal of an optical sensor unit for determining a droplet flight in front of the fresh air intake port or as a function of the signal of a rain sensor.

7. A controller for air conditioning system in a vehicle, wherein the controller is configured to:

calculate an amount of water at a fresh air intake port of the vehicle;

determine if the amount of water at the fresh air intake port exceeds a predetermined value;

reduce, if the predetermined value is exceeded, an amount of air that is drawn in by the air conditioning system through the fresh air intake port.

8. The controller of claim 7, wherein the controller is further configured to reduce the amount of the air that is drawn in by the air conditioning system when at least one additional condition is met, wherein the at least one additional condition includes at least one of a speed of the vehicle being less than a pre-set speed limit value, the blower output of the air conditioning system is greater than a pre-set blower limit value, and the outside temperature being higher than a pre-set outside temperature limit value.

9. The controller of claim 7, wherein the controller is further configured to reduce the amount of air that is drawn in by the air conditioning system through the fresh air intake port by causing at least one of an enlarging of an opening angle of an air recirculation flap, a reducing of a blower voltage, and a throttling of a fresh air flap.

10. The controller of claim 7, wherein the controller is configured to reduce the amount of the air that is drawn in by the air conditioning system comprises until at least one of a targeted time interval has expired, at least one condition for reducing the amount of air drawn in through the fresh air intake port is no longer fulfilled, or until a humidity in the interior of the vehicle exceeds a pre-set limit value.

11. The controller of claim 7, wherein the controller is configured to determine the measure for the amount of water collected at the fresh air intake port as a function of at least one of a fluid level indicating sensor signal, a signal from an optical sensor that determines a droplet flight in front of the fresh air intake port, and a rain sensor signal.

12. A method for operating an air conditioning system in a vehicle comprising the acts of:

calculating an amount of water at a fresh air intake port of the vehicle;

determining if the amount of water at the fresh air intake port exceeds a predetermined value; and reducing, if the predetermined value is exceeded, an amount of air that is drawn in by the air conditioning system through the fresh air intake port.

13. The method of claim 12, wherein reducing the amount of air that is drawn in by the air conditioning system comprises reducing the amount of air that is drawn in by the air conditioning system when at least one additional condition is met, wherein the at least one additional condition includes at least one of a speed of the vehicle being less than a pre-set speed limit value, the blower output of the air conditioning system is greater than a pre-set blower limit value, and the outside temperature being higher than a pre-set outside temperature limit value.

14. The method of claim 12, wherein reducing the amount of air that is drawn in by the air conditioning system comprises reducing the amount of air that is drawn in by the air conditioning system by performing at least one of enlarging an opening angle of an air recirculation flap, reducing of a blower voltage, and throttling a fresh air flap.

15. The method of claim 12, wherein reducing the amount of air that is drawn in by the air conditioning system comprises reducing the amount of air that is drawn in by the air conditioning system until at least one of a targeted time interval has expired, a condition for reducing the amount of air drawn in through the fresh air intake port is no longer fulfilled, or until a humidity in an interior of the vehicle exceeds a pre-set limit value.

16. The method of claim 12, wherein determining if the amount of water at the fresh air intake port exceeds a predetermined value comprises determining if the amount of water at the fresh air intake port exceeds a predetermined value as a function of at least one of a fluid level indicating sensor signal, a signal from an optical sensor that determines a droplet flight in front of the fresh air intake port, and a rain sensor signal.

* * * * *